Feb. 17, 1925.

A. J. JUNG 1,526,498

CURTAIN, KEY, AND OTHER RING

Filed July 16, 1924

Inventor.
Alfred J. Jung.
by Church & Church
his attys.

Patented Feb. 17, 1925.

1,526,498

UNITED STATES PATENT OFFICE.

ALFRED JAMES JUNG, OF LONDON, ENGLAND.

CURTAIN, KEY, AND OTHER RING.

Application filed July 16, 1924. Serial No. 726,355.

*To all whom it may concern:*

Be it known that I, ALFRED JAMES JUNG, a British subject, and a resident of London, England, have invented certain new and useful Improvements in Curtain, Key, and Other Rings; and I do hereby declare the following to be a full, clear, and exact description of the same, reference being had to the accompanying drawings, forming part of the specification, and to the characters of reference marked thereon.

This invention relates to curtain, key and other rings and refers to rings which are formed from or of a single piece of wire, rod or the like.

The chief object of the present invention is to provide for such rings a simple and efficient self-acting securing or fastening device formed in the body of the ring without protruding, projecting or loose parts and which will hold the meeting ends of the ring rigidly and against any lateral or longitudinal displacement or accidental disconnection.

According to the present invention, there is formed or furnished on each of the two ends of the material forming the ring, a transverse tooth or notch which is undercut or hooked and on one end is cut a short longitudinal notch or groove while on the other end is formed a longitudinal projection rib or ridge.

Referring to the accompanying drawings:—

A and B are the undercut teeth.

C is the longitudinal notch or cut, and—

D is the longitudinal ridge or tooth.

Figure 1:
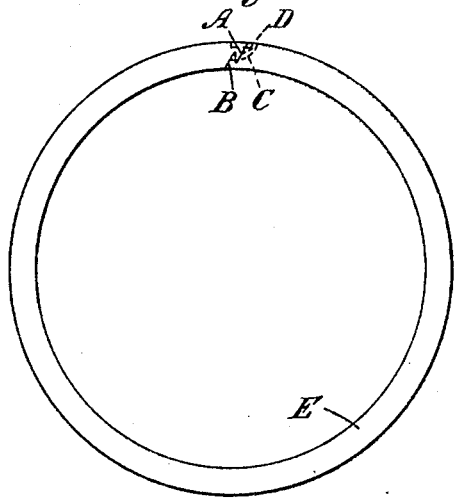
Fig. 1 shows a ring constructed in accordance with or embodying the present invention the ring being in the closed position.
Figure 2:
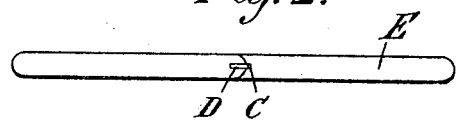
Fig. 2 is a plan of Fig. 1.
Figure 3:
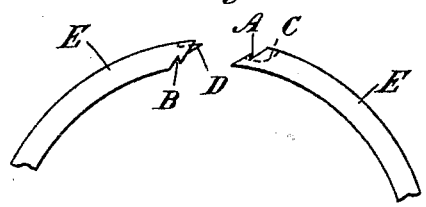
Fig. 3 shows the ends of a ring in the open position.
Figure 4:
Fig. 4 is an end view of one of the ends of the ring.
Figure 5:
Fig. 5 is a similar view of the other end of the ring.

The two ends of the ring E are cut through or formed at an angle (see Fig. 3) to the vertical plane, and across the ends are made the two transverse cuts A and B, one on each end the cut A being on the upper and the cut B on the under side. Thus when the two ends are brought together these transverse cuts A and B overlay and interlock with the inclined faces of the two ends in close contact. These two interlocking teeth prevent the ends of the ring from being drawn apart.

On the end having the transverse cut A is the longitudinal notch or groove C which is of somewhat V-shape or its may have rounded or straight sides, and on the other end having the transverse tooth or cut B is a rib, tooth or projection D which when the ends of the ring are brought together and the teeth A and B are interlocked, engage and prevent sidewise or lateral movement of the ends of the ring.

The groove C may be formed by cutting, stamping or in any convenient manner, and the projection D may also be formed or produced by punching or stamping a portion of the end of the ring.

When the ring is closed, as the parts of the fastening are formed in the body of the ring itself they are practically invisible and no parts protrude or project from the surface of the ring, the ends of which are firmly held against longitudinal or lateral displacement and also against accidental disengagement.

In the preferred embodiment of the invention as illustrated in the accompanying drawings the ends of the split ring have a tendency to flex radially outward, due to the resiliency of the material of which the ring is composed, but it will be apparent that this does nothing more than hold the transverse locking elements tightly in engagement with each other. When it is desired to open the ring nothing need be done except to place the thumb on one of the ring ends, the end having the tooth A thereon, and press said ring end substantially radially inward. This simultaneously releases both sets of cooperating elements and permits the ring ends to move apart. Compared with most of the devices of the prior art it will be found that this construction possesses several advantages amongst which are the following: The ring is preferably made of a single piece of resilient material; the cooperating elements are formed integral with the ring itself; and, the latching elements are rigid and strong and are not very apt to become broken.

What I claim is:—

1. As a new article of manufacture, a one-piece split ring of resilient material provided with a fastening means for the ring ends comprising two transverse and co-operating rigid teeth formed one on each end of the ring which interlock and prevent endwise displacement, a longitudinal notch on one end of the ring said notch being open at the exterior surface of the ring, and a longitudinal ridge or tooth on the other end of the ring adapted to enter said notch to prevent lateral displacement of said ends.

2. As a new article of manufacture, a one-piece split ring of resilient material, the ends of the ring being disposed at an acute angle to a line radial of the ring, cooperating transverse rigid teeth formed on the ring ends, a longitudinal tooth on one end adapted to engage a longitudinal notch or groove in the other end, said transverse and longitudinal teeth being simultaneously releasable by flexing the ring ends relatively to each other radially of the ring.

3. As a new article of manufacture, a split ring composed of resilient material, cooperating elements on said ends for holding the ends against relative lateral movement one of said elements being formed by a notch open at the exterior surface of the ring, and cooperating elements on said ends for releasably locking the ends against relative longitudinal movement, said last mentioned elements being releasable from each other by flexing said ring ends relatively to each other substantially radially of the ring.

4. As a new article of manufacture, a split ring composed of a single piece of resilient material, the end faces of the ring being disposed at an angle to a line drawn radially of the ring, cooperating elements on said ends for holding the ends against relative lateral movement, and interlocking cooperating elements on said ends for releasably locking the ends against longitudinal movement, both sets of said elements being simultaneously disengageable from each other by flexing one of said ends in a direction parallel to the face of the other end.

ALFRED JAMES JUNG.